United States Patent

Sato et al.

[11] 3,911,034
[45] Oct. 7, 1975

[54] OXIDATIVE DEHYDROGENATION PROCESS OF AROMATIC COMPOUNDS

[75] Inventors: Haruhito Sato; Nobuaki Shimizu; Kosaku Honna; Konomu Kurisawa, all of Chiba, Japan

[73] Assignee: Idemitsu Kosan Co. Ltd., Japan

[22] Filed: Jan. 4, 1974

[21] Appl. No.: 430,879

[30] Foreign Application Priority Data
Jan. 22, 1973 Japan.................... 48-9330

[52] U.S. Cl............ 260/650 R; 252/437; 260/669 R
[51] Int. Cl.[2].................... C07C 5/48; C07C 25/28
[58] Field of Search........ 260/650 R, 669 R, 680 E; 252/437

[56] References Cited
UNITED STATES PATENTS

| | | | |
|---|---|---|---|
| 3,320,329 | 5/1967 | Nolan | 260/680 E |
| 3,497,564 | 2/1970 | Allen et al. | 260/650 R |
| 3,679,601 | 7/1972 | Nolan et al. | 252/437 |
| 3,732,327 | 5/1973 | Pitzer | 260/680 E |
| 3,801,671 | 4/1974 | Marsheck | 260/680 E |

*Primary Examiner*—Paul M. Coughlan, Jr.
*Attorney, Agent, or Firm*—McGlew and Tuttle

[57] ABSTRACT

Oxidative dehydrogenation process of aromatic compounds is provided by oxidatively dehydrogenating (1) nuclear substituted ethyl benzene compound of the formula:

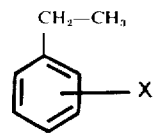

(I)

(wherein X is lower alkyl radical or halogen atom) or (2) cumene or a nuclear substituted cumene of the formula:

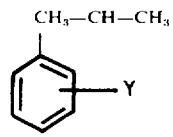

(II)

(wherein Y is hydrogen atom, lower alkyl radical or halogen atom)

in the presence of a phosphorus-tin aluminum oxide catalyst containing 10 to 40 weight percent of phosphorus calculated as $P_2O_5$, 10 to 40 weight percent of tin as $SnO_2$ and 40 to 60 weight percent of aluminum as $Al_2O_3$.

4 Claims, No Drawings

OXIDATIVE DEHYDROGENATION PROCESS OF AROMATIC COMPOUNDS

BACKGROUND OF THE INVENTION

1. Field of the Invention

The present invention relates to an oxidative dehydrogenation process of aromatic compounds. More particularly, it relates to an oxidative dehydrogenation process of aromatic compounds by oxidatively dehydrogenating (1) nuclear substituted ethyl benzene of the formula:

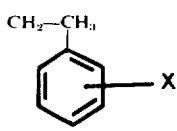

(I)

(wherein X is a lower alkyl radical or halogen atom) or (2) cumene or its nuclear substituted products of the formula:

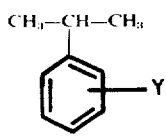

(II)

(wherein Y is a hydrogen atom, lower alkyl radical or halogen atom)
in the presence of a phosphorus-tin-aluminum oxide catalyst containing 10 to 40 weight percent of phosphorus calculated as $P_2O_5$, 10 to 40 weight percent of tin as $SnO_2$, and 40 to 60 weight percent of aluminum as $Al_2O_3$.

2. Prior Art

The conventional process of oxidative dehydrogenation of nuclear substituted ethyl benzene or cumene or its nuclear substituted products of the aforementioned general formulae (I, II) is known. Also, the method of transforming these compounds I and II to the corresponding styrene derivatives is according to the prior art.

With regard to the oxidative dehydrogenation process of such aromatic compounds, many studies have been done to develop a novel catalyst because the main technical problem therein is to develop such a catalyst as shows long catalytic life and greatly improves the conversion ratio and selectivity of the reaction. And as a result of such studies, various catalysts have been proposed.

However, the various catalysts hitherto proposed are not satisfactory when evaluated from the industrial viewpoint. For instance, alumina catalyst or phosphorus-tin catalysts are proposed, but the former possesses the defect that catalytic life is short and the latter that the conversion ratio to the desired product is extremely low. Therefore, it is very disadvantageous to apply and use these types of catalyst industrially.

We, the inventors herein have made incessant and concentrated studies on developing a catalyst for the oxidative dehydrogenation reaction overcoming the aforementioned defects. As a result thereof, it has been found that a phosphorus-tin-aluminum oxide catalyst containing phosphorus, tin and aluminum at the ratio specified herein is suitable for the desired purpose and we completed the present invention based on this discovery.

SUMMARY OF THE INVENTION

Though the catalytic structure of phosphorus-tin-aluminum oxide used as a catalyst in this invention and the oxidation state of these elements have not yet been clearly explained, in any event it is believed that the catalyst of this invention is either a mixture or a compound containing these three elements in the form of an oxide. In this case, in order to obtain high catalytic activity, it is necessary to limit (a) the phosphorus content to from 10 to 40 % by weight calculated as $P_2O_5$, (b) the tin content to 10 to 40 % by weight as $SnO_2$, and (c) the aluminum content to from 40 to 60 % by weight as $Al_2O_3$. The catalyst with such a composition not only improves the conversion ratio and selectivity of the reaction but makes it possible to carry out the reaction at relatively low temperatures because its catalytic activity is excellent at such low temperatures.

DESCRIPTION OF THE INVENTION

Phosphorus-tin-aluminum oxide catalyst which are used in this invention can be prepared by mixing alumina sol or aluminum hydroxide, tin hydroxide and phosphoric acid in a predetermined ratio so ethyl the elementary composition of the catalyst which is finally obtained is within the aforementioned ranges, and then calcining the so-obtained catalytic composition or mixture.

Aromatic compounds applied to the dehydrogenation process of this invention are those expressed in the aforementioned general formulae (I) and (II), for instance, methyl ethyl benzene, diethyl benzene, isopropyl ethyl benzene, t-butyl ethyl benzene, chloro ethyl benzene, cumene, methyl isopropyl benzene, chloro isopropyl benzene, and mixtures thereof are useful. All of these aromatic compounds can be converted to the corresponding styrene derivatives with a favorable yield by the process of this invention.

Oxygen or air is used as the oxygen source in the oxidative dehydrogenation reaction of this invention. In this case, it is possible to use nitrogen or water as a diluent for the purpose of controlling local heating of the catalyst layer and for preventing the explosion of reactants.

The reaction is recommended to be carried out under normal pressure at a temperature of from 350° to 550°C, preferably from 400° to 450°C. In this invention, one of the big advantages obtained by using the catalyst of this invention is that the oxidative dehydrogenation reaction can be carried out at relatively low temperatures of from 400° to 450°C.

As for the reaction method, either a fixed bed or a fluid bed can be used. The ratio of the amount of catalyst compared with the amount of supplied raw material per hour is recommended to be selected within the range of from 1.0 to 15.0 g.mol$^{-1}$.hr., preferably from 5.0 to 10.0 g.mol$^{-1}$.hr. The partial pressure ratio of aromatic compounds/oxygen in the reaction system is recommended to be from 1/0.2 to 1/1.5, preferably from 1/0.5 to 1/1.0.

The present invention is further illustrated in the following examples.

EXAMPLE 1

To 800 g of alumina sol containing 10 % by weight of alumina ($Al_2O_3$), 325.8 g of tin hydroxide (16.7 % by weight as $SnO_2$) of gel form obtained by treating $SnCl_2.2H_2O$ with aqueous ammonia and washing with distilled water, and 41.5 g of phosphoric acid with 85 % concentration by weight were added. The mixture was fully kneaded and mixed with kneader, then dried at 120°C. Subsequently it was calcined for 3 hours at 800°C to make catalyst, in which phosphorus, tin and aluminum were contained respectively at the ratio of 16 % (as $P_2O_5$), 34 % (as $SnO_2$) and 50 % (as $Al_2O_3$) by weight.

In the next place, oxidative dehydrogenation reaction of various aromatic compounds was carried out with air in the presence of water as diluent in a fixed bed using the thus obtained catalyst. The conditions of reaction and results are shown in Table 1.

Water was used as diluent in Example 1 at the ratio of 3 mols to 1 mol of aromatic compound. The atomic ratio of tin/phosphorus (Sn/P) in catalyst was 1.

TABLE 1

| Reactant | Reaction Condition | | | Quantity of Catalyst | Conversion Ratio of Reactant | Reaction Product | | Decomposition Rate |
| --- | --- | --- | --- | --- | --- | --- | --- | --- |
| | Temperature (°C) | Time continued (hr.) | Oxygen/Reactant (molar ratio) | (g.mol$^{-1}$hr.) | (mol %) | Styrene Derivatives | Selectivity of Styrene Derivatives (mol %) | (mol %) |
| ethyl benzene | 450 | 10 | 0.50 | 10 | 42.0 | | 92.0 | 7.0 |
| | | | 1.00 | 10 | 55.0 | styrene | 85.0 | 13.0 |
| o-methyl ethyl benzene | 450 | 10 | 0.51 | 10 | 22.0 | o-methyl styrene | 69.0 | 18.0 |
| p-t-butyl ethyl benzene | 450 | 10 | 0.51 | 10 | 29.0 | p-t-butyl | 91.0 | 8.0 |
| | | | 1.05 | 10 | 43.0 | styrene | 87.0 | 13.0 |
| p-chloro ethyl benzene | 450 | 10 | 0.51 | 10 | 51.0 | p-chloro | 88.0 | 6.0 |
| | | | 0.99 | 10 | 66.0 | styrene | 82.0 | 12.0 |
| cumene | 450 | 10 | 0.50 | 10 | 27.0 | α-methyl | 86.0 | 13.0 |
| | | | 1.03 | 10 | 35.0 | styrene | 72.0 | 25.0 |

EXAMPLE 2

In the same way as Example 1, the catalyst with fixed ratio of tin/phosphorus (ratio by weight as $SnO_2/P_2O_5$ = 52/48) but with various contents of aluminum was prepared.

The reaction was carried out with such catalyst under the same conditions as those in Example 1 (provided that the mol ratio of oxygen/aromatic compound is 1.0). The result is shown in Table 2.

TABLE 2

| Aluminium Content of Catalyst (as $Al_2O_3$, wt %) | Reactant | | Reaction Product | |
| --- | --- | --- | --- | --- |
| | Substance | Conversion Ratio (mol %) | Styrene Derivatives | Selectivity (mol %) |
| 20 | p-t-butyl ethyl benzene | 28.0 | p-t-butyl styrene | 87.0 |
| | p-chloro ethyl benzene | 47.0 | p-chloro styrene | 79.0 |
| 40 | p-t-butyl ethyl benzene | 42.0 | p-t-butyl styrene | 87.0 |
| | p-chloro ethyl benzene | 60.0 | p-chloro styrene | 81.0 |
| 50 | p-t-butyl ethyl benzene | 43.0 | p-t-butyl styrene | 87.0 |
| | p-chloro ethyl benzene | 66.0 | p-chloro styrene | 82.0 |
| | p-t-butyl ethyl benzene | 45.0 | p-t-butyl styrene | 87.0 |
| 60 | p-chloro ethyl benzene | 65.0 | p-chloro styrene | 81.0 |
| | p-t-butyl ethyl benzene | 32.0 | p-t-butyl styrene | 80.0 |
| 100 | p-chloro ethyl benzene | 43.0 | p-chloro styrene | 75.0 |

EXAMPLE 3

In the same way as Example 1, the catalyst with fixed ratio of tin/aluminum (ratio by weight as $SnO_2/Al_2O_3$ = 50/50) but with various contents of phosphorus was prepared.

The dehydrogenation reaction of aromatic compound was carried out with such catalyst under the same conditions as those in Example 1 (provided that the mol ratio of $O_2$/aromatic compound is 1.0). The result is shown in Table 3.

TABLE 3

| Phosphorus Content of Catalyst (as $P_2O_5$, wt %) | Reactant | | Reaction Product | |
| --- | --- | --- | --- | --- |
| | Substance | Conversion Ratio (mol %) | Styrene Derivatives | Selectivity (mol %) |
| 0 | p-t-butyl ethyl benzene | 22.0 | p-t-butyl styrene | 77.0 |
| | p-chloro ethyl benzene | 44.0 | p-chloro styrene | 74.0 |
| 10 | p-t-butyl ethyl benzene | 43.0 | p-t-butyl styrene | 86.0 |
| | p-chloro ethyl benzene | 62.0 | p-chloro styrene | 81.0 |
| 20 | p-t-butyl ethyl benzene | 44.0 | p-t-butyl styrene | 86.0 |
| | p-chloro ethyl benzene | 65.0 | p-chloro styrene | 82.0 |
| 30 | p-t-butyl ethyl benzene | 36.0 | p-t-butyl styrene | 87.0 |
| | p-chloro ethyl benzene | 63.0 | p-chloro styrene | 82.0 |
| 40 | p-t-butyl ethyl benzene | 27.0 | p-t-butyl styrene | 85.0 |
| | p-chloro ethyl benzene | 58.0 | p-chloro styrene | 80.0 |
| 50 | p-t-butyl ethyl benzene | 25.0 | p-t-butyl styrene | 83.0 |
| | p-chloro ethyl benzene | 54.0 | p-chloro styrene | 77.0 |

EXAMPLE 4

In the same way as Example 1, the catalyst in which the ratio of phosphorus/aluminum was fixed (ratio by weight as $P_2O_5/Al_2O_3 = 40/60$) but the content of tin was varied was prepared.

The dehydrogenation reaction of aromatic compound was carried out with such catalyst under the same conditions as those in Example 1 (provided that mol ratio of oxygen aromatic compound is 1.0). The result is shown in Table 4.

TABLE 4

| Tin Content of Catalyst (as $SnO_2$, wt %) | Reactant Substance | Conversion Ratio (mol %) | Reaction Product Styrene Derivatives | Selectivity (mol %) |
|---|---|---|---|---|
| 0 | p-t-butyl ethyl benzene | 32.0 | p-t-butyl styrene | 83.0 |
|  | p-chloro ethyl benzene | 49.0 | p-chloro styrene | 78.0 |
| 10 | p-t-butyl ethyl benzene | 40.0 | p-t-butyl styrene | 85.0 |
|  | p-chloro ethyl benzene | 61.0 | p-chloro styrene | 80.0 |
| 20 | p-t-butyl ethyl benzene | 45.0 | p-t-butyl styrene | 87.0 |
|  | p-chloro ethyl benzene | 67.0 | p-chloro styrene | 83.0 |
| 30 | p-t-butyl ethyl benzene | 43.0 | p-t-butyl styrene | 87.0 |
|  | p-chloro ethyl benzene | 62.0 | p-chloro styrene | 82.0 |
| 40 | p-t-butyl ethyl benzene | 44.0 | p-t-butyl styrene | 86.0 |
|  | p-chloro ethyl benzene | 56.0 | p-chloro styrene | 80.0 |
| 60 | p-t-butyl ethyl benzene | 30.0 | p-t-butyl styrene | 82.0 |
|  | p-chloro ethyl benzene | 40.0 | p-chloro styrene | 78.0 |
| 100 | p-t-butyl ethyl benzene | 15.0 | p-t-butyl styrene | 76.0 |
|  | p-chloro ethyl benzene | 36.0 | p-chloro styrene | 73.0 |

We claim:

1. Process for oxidative dehydrogenation of aromatic compounds, comprising oxidative dehydrogenating a compound selected from the group consisting of (1) nuclear substituted ethyl benzene having the formula:

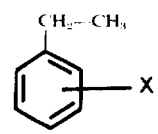

(I)

(wherein X represents a lower alkyl radical or a halogen atom)

and (2) cumene or a nuclear substituted cumene having the formula:

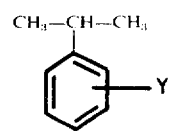

(II)

(wherein Y represents a hydrogen atom, a lower alkyl radical or a halogen atom), said dehydrogenating being carried out at a temperature of from about 350° to 550°C in the presence of an oxidizing agent selected from the group consisting of oxygen, air and a mixture of gas containing oxygen or air and nitrogen or water and a phosphorus-tin-aluminum oxide catalyst composition comprising from about 10 to about 40 weight percent phosphorus calculated on the basis of $P_2O_5$, from about 10 to about 40 weight percent of tin calculated on the basis of $SnO_2$ and from about 40 to about 60 weight percent of aluminum calculated as $Al_2O_3$, said catalyst composition being prepared by mixing alumina sol or aluminum hydroxide, tin hydroxide and phosphoric acid at a predetermined ratio so that elementary phosphorus-tin-aluminum composition of catalyst finally obtained is within the aforementioned weight percents; and then calcining the resultant mixture; the ratio of the amount of catalyst composition to the amount of reactant supplied per hour in said process being from about 1.0 to 15.0 g.mol$^{-1}$.hr. and the partial pressure ratio of reactant aromatic compound to oxidizing agent being from about 1/0.2 to 1/1.5.

2. The process according to claim 1, wherein said process is carried out at a temperature from about 400° to 450°C.

3. The process according to claim 1, wherein said process is carried out at a ratio of catalyst to reactant per hour is from about 5.0 to about 10.0 g.mol$^{-1}$.hr.

4. The process according to claim 1, wherein the said partial pressure ratio of aromatic reactant compounds to oxidizing agent is from about 1/0.5 to about 1/1.0.

* * * * *